(12) United States Patent
Brevart et al.

(10) Patent No.: US 6,500,517 B1
(45) Date of Patent: Dec. 31, 2002

(54) SHOCK REDUCING STRUCTURE

(75) Inventors: Bertrand Brevart, Toulouse; Thierry Youssefi, Labastidette; Emmanuel Bodin, Cholet, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/516,514

(22) Filed: Mar. 1, 2000

(30) Foreign Application Priority Data

Mar. 4, 1999 (FR) .............................. 99 02684

(51) Int. Cl.$^7$ .................................................. B32B 3/12
(52) U.S. Cl. ..................... 428/117; 428/73; 428/116; 428/402; 324/125; 244/158
(58) Field of Search ................... 428/116, 117, 428/118, 73, 462; 324/125; 244/158

(56) References Cited

U.S. PATENT DOCUMENTS

| | | | |
|---|---|---|---|
| 4,193,829 A | * | 3/1980 | Kourtides et al. |
| 4,330,494 A | * | 5/1982 | Iwata et al. |
| 4,965,097 A | * | 10/1990 | Bach |
| 5,041,472 A | | 8/1991 | Myer |
| 5,102,107 A | | 4/1992 | Simon et al. |
| 6,221,445 B1 | * | 4/2001 | Jones |

FOREIGN PATENT DOCUMENTS

| | | |
|---|---|---|
| DE | 34 31 776 A1 | 3/1985 |
| FR | 2 212 011 | 7/1974 |

* cited by examiner

*Primary Examiner*—Deborah Jones
*Assistant Examiner*—Wendy Boss
(74) *Attorney, Agent, or Firm*—Sughrue Mion, PLLC

(57) ABSTRACT

A structure for reducing shock transmitted from a source (6) to an equipment unit (7) in a hardware system, which structure includes a honeycomb cellular support member (2, 3, 4 or 5) carrying the equipment unit to be protected from shock and/or the source. At least some of the honeycomb cells are filled with rigid microgranules whose dimensional characteristics are preferably heterogeneous, within given limits.

16 Claims, 3 Drawing Sheets

SHOCK REDUCING STRUCTURE

BACKGROUND OF THE INVENTION

The invention relates to structures which incorporate honeycomb support members for equipment units of systems subjected to shock. It relates more particularly to structures in which it is necessary to reduce the level of shock transmitted from a source to an equipment unit through the structure.

Some hardware systems, such as satellites or their launch vehicles, include relatively fragile equipment units whose operation can be disturbed to a greater or lesser extent by shock transmitted to them through the structure supporting them, especially when the shock is from a source carried by the structure. It is not always possible to have the sources of shock far enough away from the equipment units to be protected, either in small satellites referred to as minisatellites or microsatellites or in large satellites which include a large number of equipment units.

Satellites and launch vehicles often include many mechanisms, in particular pyrotechnic mechanisms, for igniting, moving, deploying, separating or activating the various equipment units and which are the source of intense shock. These include in particular separation mechanisms of launch vehicles and mechanisms for deploying payloads, which tend to be more and more powerful. This leads to a search for solutions which reduce the shock to which systems, and in particular equipment units which are sensitive to shock, are subjected.

It is possible to design relatively complex structures which attenuate shock at connections in the hardware structure supporting a system and which includes a support for an equipment unit which has to be protected because it is sensitive to shock. However, such structures are rarely used because they must be individually designed and appropriate modeling is difficult.

The current trend is to attempt to attenuate shock at source, for example by incorporating an elastomer material to absorb some shock waves. For example, such means halve the power of the shock at frequencies above 1000 Hz in the case of a satellite-borne antenna and solar panel deployment subsystem, for example.

There appears to be no truly effective method of attenuating shock operating on the path of propagation of shock waves and in particular as close as possible to the equipment units to be protected.

The use of honeycomb structure supports to save weight in onboard systems and in particular in satellite-borne systems is known in the art. Such supports are used to mount various equipment units, including those which constitute sources of shock, and in particular pyrotechnic mechanisms of the kind referred to above.

SUMMARY OF THE INVENTION

The invention therefore proposes a structure intended to reduce shock transmitted from a source to an equipment unit in a hardware system, which structure incorporates a honeycomb support member carrying the equipment unit to be protected from shock and/or the source.

According to a feature of the invention the structure includes a support member including honeycomb cells which are filled with rigid microgranules.

Accordingly, the microgranules are free to move, slip and rub, and these phenomena attenuate the vibratory waves that propagate in the structure in the event of pyrotechnic shock.

According to a feature of a first embodiment, the structure includes a support member incorporating honeycomb cells filled with microgranules which is mounted between a member carrying a source of shock and a member carrying an equipment unit to be protected from shock.

According to a feature of a second embodiment the structure includes an equipment unit to be protected from shock and/or a source of shock mounted on a support member whose cells are filled with microgranules.

According to a feature of a third embodiment the structure includes a honeycomb cellular support member includes cells filled with microgranules in one or more delimited areas each consisting of a main part where an equipment unit to be protected is mounted and a peripheral extension which borders the main part externally.

According to a feature of a fourth embodiment the structure includes a honeycomb cellular support member includes cells filled with microgranules in one or more delimited areas each consisting of a main part where a source of shock is mounted and a peripheral extension which borders the main part.

BRIEF DESCRIPTION OF THE DRAWINGS

The invention, its features and its advantages are explained in the following description, which is given with reference to the drawings listed below.

DETAILED DESCRIPTION OF THE INVENTION

The structure of the invention is particularly intended for use in protecting from shock equipment unit(s) of a system such as a satellite, a launch vehicle, or some other aircraft.

As already indicated above, conventional mechanisms produce shocks because of their main function or as an ancillary effect thereof, and this is true in particular of pyrotechnic mechanisms in hardware systems of the kinds referred to above. Such mechanisms are increasingly required to be co-located with other equipment units of the system including them, which usually has to be accommodated in the smallest possible volume. Some equipment units, in particular electronic units, can be relatively fragile and attempts are therefore made to limit the shock transmitted to them. When a mechanism constituting a source of shock and an equipment unit which is to be protected from shock are part of the same hardware system, they are generally carried on a support structure which is common to all parts of that system, or more particularly by a structure which constitutes a part of the common support structure.

Figure 1:
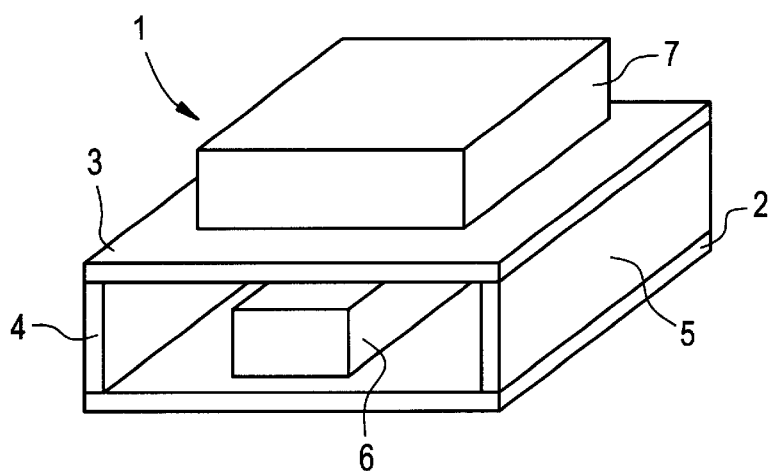
FIG. 1 shows a simplified example of a structure of the invention for supporting a hardware system.

FIG. 1 is a diagrammatic representation of one example of a structure 1 of this kind, comprising support members 2, 3, 4, 5 which here are assembled to form a box section. The latter has a lower level in which there is mounted a mechanism constituting a source 6 of shock, for example a plunger, a valve, or a separation system. An equipment unit 7 in the upper level of the box section receives any shock transmitted to the box section by the source. In this diagrammatic example, transmission is from the source 6 to the equipment unit 7 via the support members 2 to 5. In accordance with routine practice in this field, at least some of the support members of the structure 1 can take the form of honeycomb panels each of which is made up of a cellular and usually plane metal structure whose contiguous cells are closed at one end at least by a thin, e.g. metal, plate forming a skin covering them.

Figure 2:
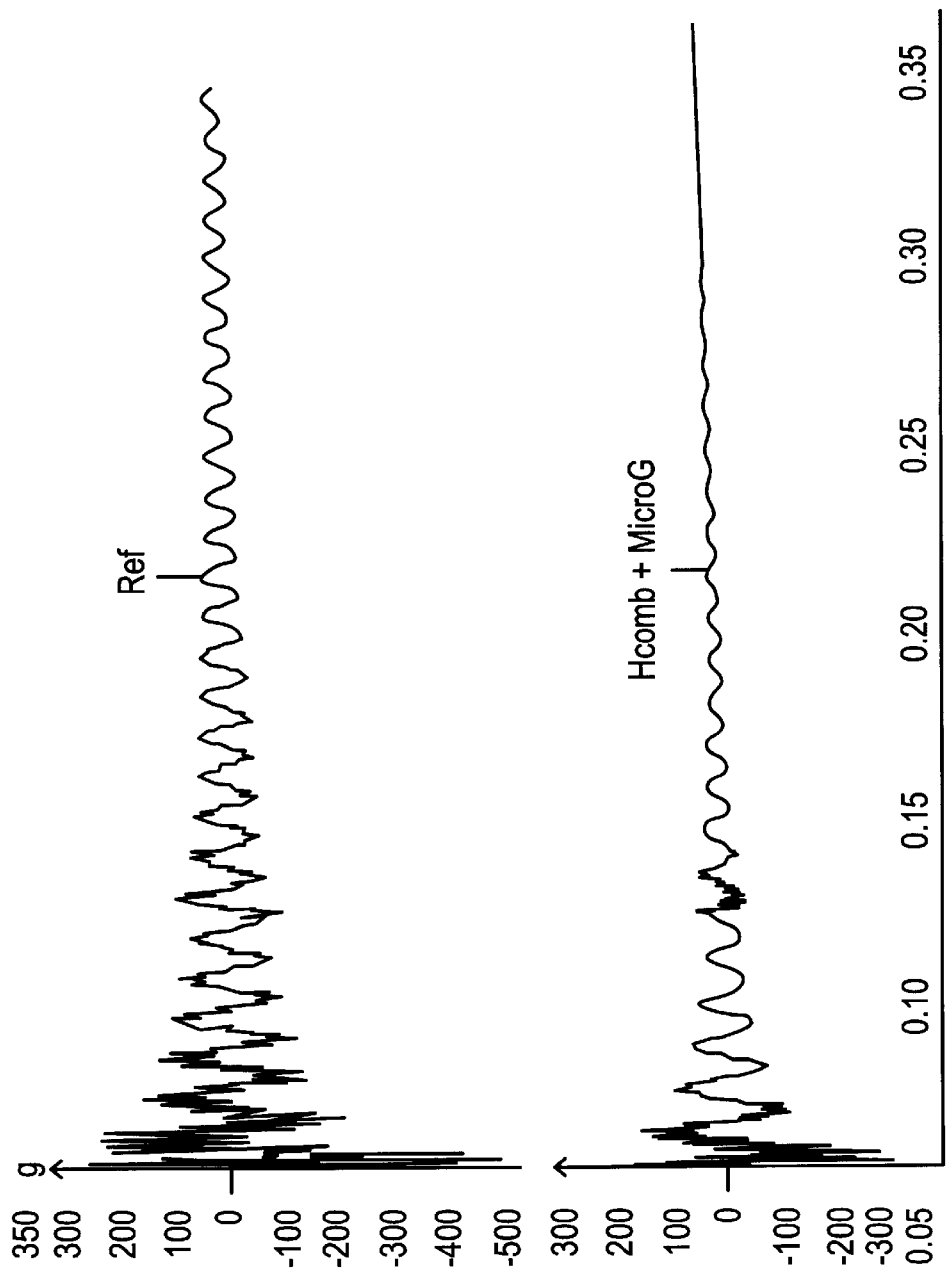
FIG. 2 gives two timing diagrams showing acceleration due to a reference shock as measured at the ends of two beams, one with empty cells and the other in accordance with the invention.
Figure 3:
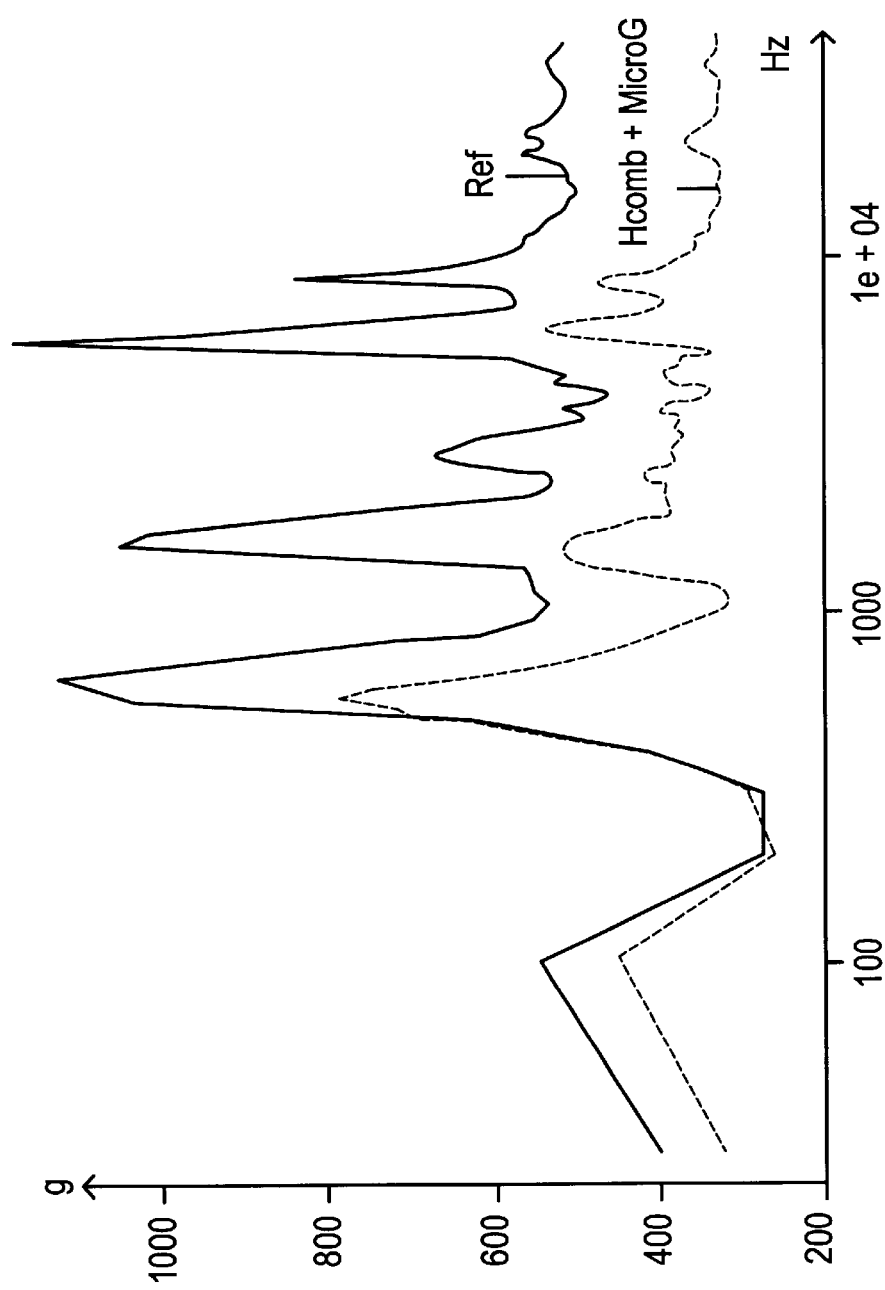
FIG. 3 is a diagram giving two curves which show the shock response spectra of accelerations due to a reference shock as measured at the ends of two beams, one with empty cells and the other in accordance with the invention.

The curves marked "Ref" in FIGS. 2 and 3 are respectively a timing diagram and a shock response spectrum of accelerations measured at the non-built-in end of a built-in support member in the form of a rectangular beam subjected to a semisinusoidal shock of 800 g intensity and 0.3 ms duration. This member was an aluminum beam with vertical honeycomb cells closed by a thin plate or skin at each end. To carry out tests, one end of the beam was built in over a length of 30 mm. The dimensions of the beam were 300× 30×10 mm.

To reduce the shock transmitted by a beam of this kind the honeycomb cells are filled with rigid low-density microgranules. To save weight, the microgranules in each cell, which is closed at one end by a first skin, can be hollow. In one embodiment, the microgranules are compacted with no possibility of relative movement once the cells have been closed by a second skin at their other end. This compacting encourages rubbing between the microgranules when waves pass through them, which improves the attenuation.

The microgranules are in the form of hollow microspheres, for example, which can be made of glass for high stiffness. The density obtained with this filler material is routinely in the order of 100 kg/m$^3$ to 200 kg/m$^3$. In a preferred embodiment the filler material consists of microgranules with heterogeneous dimensional characteristics and a maximum dimension of the order of 500 microns, for example. They can also have a minimum dimension. To prevent the microgranules moving from one cell to another, this minimum dimension is chosen to be greater than the size (which is of the order of 100 microns) of the microperforations which are usually present in the walls of the honeycomb cells, for example. It is also possible to prevent the smallest microgranules migrating from one honeycomb cell to another by other means, for example an interposed open-cell foam.

The curves marked "HComb+MicroG" in FIGS. 2 and 3 are respectively a timing diagram and a shock response spectrum of accelerations as measured at the end of a support member under the conditions defined above. The member had exactly the same structure as the previous one but its cells were filled with glass microspheres under the conditions imposed by the invention. In this example, this filling increased the mass of the support member by approximately 25% and also shifted the time maximum of the measured acceleration from 500 g to 300 g, as can be seen by comparing the curves marked "Ref" and "HComb+MicroG" in FIG. 2. The shock response spectrum was attenuated at practically all frequencies, with particularly high efficiency and by an amount of the order of 6 dB at frequencies between 1000 Hz and 10000 Hz.

The invention provides structures including one or more honeycomb cellular support members filled with rigid and possibly hollow microgranules. As indicated above, in one particular embodiment the microgranules are compacted, without play, inside the cells.

Referring to FIG. 1, it is feasible to construct the structure 1 using a honeycomb cellular panel 3 filled with microgranules to carry the equipment unit 7 to be protected and/or another honeycomb cellular panel 2 filled with microgranules to carry the mechanism constituting the source 6 of shock. The equipment unit and the source of shock are mounted on intermediate support members which are parts of the same structure 1. It is also feasible to employ intermediate support members 4 and 5 with honeycomb cells filled with microgranules as spacers between the support members 2 and 3 of the structure.

Many embodiments are feasible, depending on the particular requirements and constraints of the structures and the respective positions of the equipment unit(s) to be protected from shock and the source(s) of shock.

Figure 4:
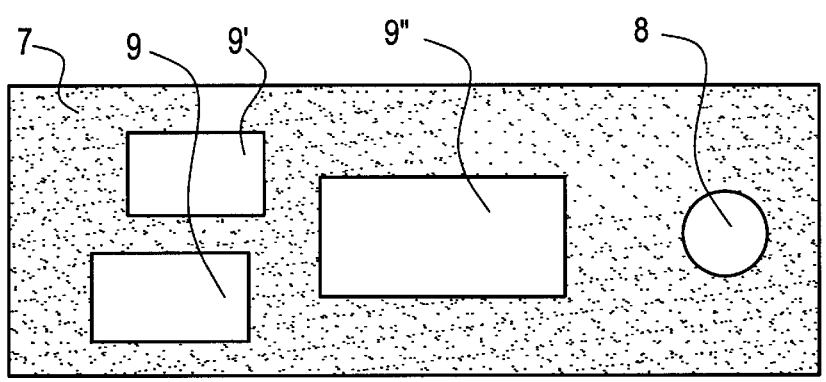
FIGS. 4, 5 and 6 show three embodiments of a structure of the invention.
Figure 5:
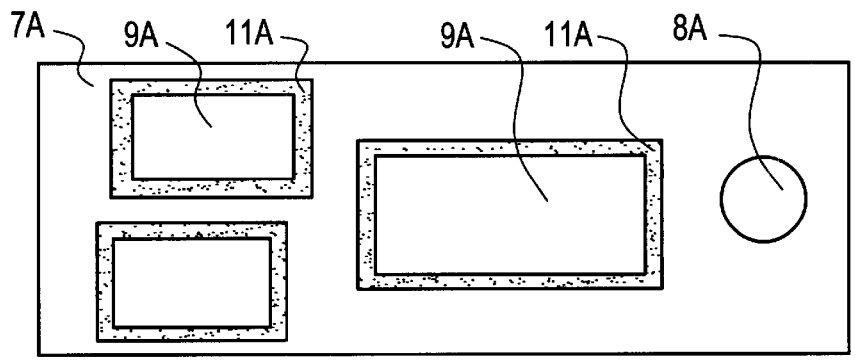
Figure 6:
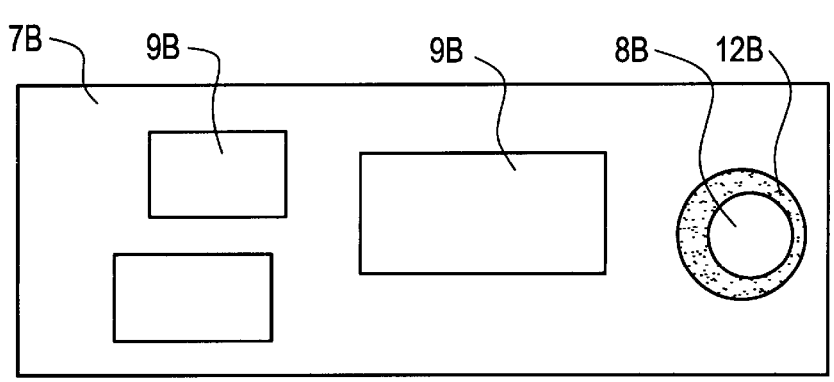

FIGS. 4 to 6 show structures with a source of shock and an equipment unit to be protected from shock mounted on a common support member 7, 7A or 7B having honeycomb cells filled with microgranules, as defined above.

In a first embodiment, shown in FIG. 4, all the honeycomb cells of a support member 7 of the above kind are identically filled with rigid and for example hollow microgranules whose outside dimensions are preferably heterogeneous and between two particular limiting values. 5 A mechanism constituting a source 8 of shock is mounted on the support member 7, preferably at one end of the support. Equipment units 9, 9' and 9" are also mounted on the element 7 and receive shocks transmitted to them by the source 8. These shocks therefore reach them primarily through cells filled with microgranules which reduce the shock transmitted to the equipment units.

In the two embodiments shown in FIGS. 5 and 6, only some honeycomb cells of the respective support member 7A or 7B are filled with microgranules. The other cells remain empty because the filled cells are sufficient to obtain the required reduction of shock at the equipment unit(s) to be protected. This limits the additional weight caused by filling the cells.

In the embodiment shown in FIG. 5, only cells within a damping area of the support members 7A are filled with microgranules, this area comprising a main part where an equipment unit 9A to be protected is mounted and a peripheral extension 11A which borders the main part externally.

In the embodiment shown, the support member includes only one source 8A of shock and three separate equipment units 9A to be protected from shock waves transmitted from the source of shock via the support member. An individual damping area comprising a main part and a peripheral extension for each equipment unit 9A is then provided on the support member 7A. Only the peripheral extension 11A, shown shaded, of each damping area is shown in FIG. 5, because the corresponding main part is concealed by the equipment unit that it carries.

Each damping area made up of cells filled with microgranules is therefore separated by empty cells from any other damping area of the same support member. The solution proposed above is also suitable if several equipment units each mounted in an intermediate area of cells filled with microgranules of a support member are to be protected from several sources of shock, shock waves from which are likely to be transmitted to the equipment units via their support member.

In the embodiment shown in FIG. 6, a source 8B of shock carried by a honeycomb cellular support member 7B on which are also mounted several equipment units 9B, at least one of which is to be protected, is treated individually.

A damping area for the source 8B of shock is then provided on the support member 7B by filling the cells of part of that member with microgranules. As previously, the damping area has a main part where the source 8B of shock is mounted and a peripheral extension 12B which borders the main part externally.

One advantage of solutions providing one or more damping areas, as defined above, is that they minimize the additional weight caused by filling the cells.

The selective or global filling of a honeycomb cellular support member with microgranules has the advantage of partitioning the volume of damping material into a large number of separate volumes which are practically independent of each other. The reduction of shock obtained in this way is the result of implementing complex phenomena relating in particular to the fluid behavior of the medium, the fluid-structure coupling, the absorption properties of the granular medium, dry rubbing and non-linearities. This is complemented by impedance breaks in the case of support members with localized filling.

One advantage of the invention is to enable a parallel approach, as compared to the series approach associated with the use of an intermediate elastomer.

The stiffness of the support member and the structure including it is not modified. Nor is there any additional intrusion due to the filling of the cells, as this filling utilizes volumes that were previously unused.

What is claimed is:

1. An electrical hardware system, comprising a structure for reducing shock transmitted from a source (6) to an equipment unit (7) in the hardware system, which structure includes a first honeycomb cellular support member (2) carrying the equipment unit to be protected from shock and/or the source, the first honeycomb cellular support member including honeycomb cells which are filled with loose microgranules.

2. The electrical hardware system according to claim 1, wherein the first honeycomb cellular support member carries the source of shock, and further comprising a second support member (4, 5) incorporating honeycomb cells filled with microgranules mounted between the first honeycomb cellular support member and a third member (3) carrying the equipment unit to be protected from shock.

3. The electrical hardware system according to claim 1, wherein the source of shock is mounted on the first honeycomb cellular support member.

4. The electrical hardware system according to claim 1, wherein the first honeycomb cellular support member (7A) includes cells filled with microgranules in one or more delimited areas each consisting of a main part where the equipment unit (9A) to be protected is mounted and a peripheral extension (11A) which borders the main part externally.

5. The electrical hardware system according to claim 1, wherein the first honeycomb cellular support member (7A) includes cells filled with microgranules in one or more delimited areas each consisting of a main part where the source (8B) of shock is mounted and a peripheral extension (12B) which borders the main part.

6. The electrical hardware system according to claim 1, wherein the rigid microgranules filling the honeycomb cells have heterogeneous dimensional characteristics.

7. The electrical hardware system according to claim 1, wherein said microgranules have a size between about 100 microns and 500 microns.

8. The electrical hardware system according to claim 1, wherein a density of said microgranules in said honeycomb cells is between about 100 kg/m$^3$ and 200 kg/m$^3$.

9. A satellite, comprising a structure for reducing shock transmitted from a source to an equipment unit in the satellite, said structure includes a first support member carrying said equipment unit to be protected from shock, said first support member including honeycomb cells filled with loose microgranules.

10. The satellite according to claim 9, wherein said first support member carries a source of shock, and further comprising a second support member incorporating honeycomb cells filled with loose microgranules mounted between said first support member and a third support member carrying said equipment unit to be protected from shock.

11. The satellite according to claim 9, wherein the source of shock is mounted on said first support member.

12. The satellite according to claim 9, wherein said first support member includes cells filled with microgranules in one or more delimited areas each consisting of a main part where said equipment unit to be protected is mounted and a peripheral extension that borders the main part externally.

13. The satellite according to claim 9, wherein said first support member includes cells filled with microgranules in one or more delimited areas each consisting of a main part where the source of shock is mounted and a peripheral extension that borders the main part.

14. The satellite according to claim 9, wherein said loose microgranules filling the honeycomb cells have heterogeneous dimensional characteristics.

15. The satellite according to claim 9, wherein said loose microgranules have a size between about 100 microns and 500 microns.

16. The satellite according to claim 9, wherein a density of said loose microgranules in said honeycomb cells is between about 100 kg/m$^3$ and 200 kg/m$^3$.

* * * * *